UNITED STATES PATENT OFFICE.

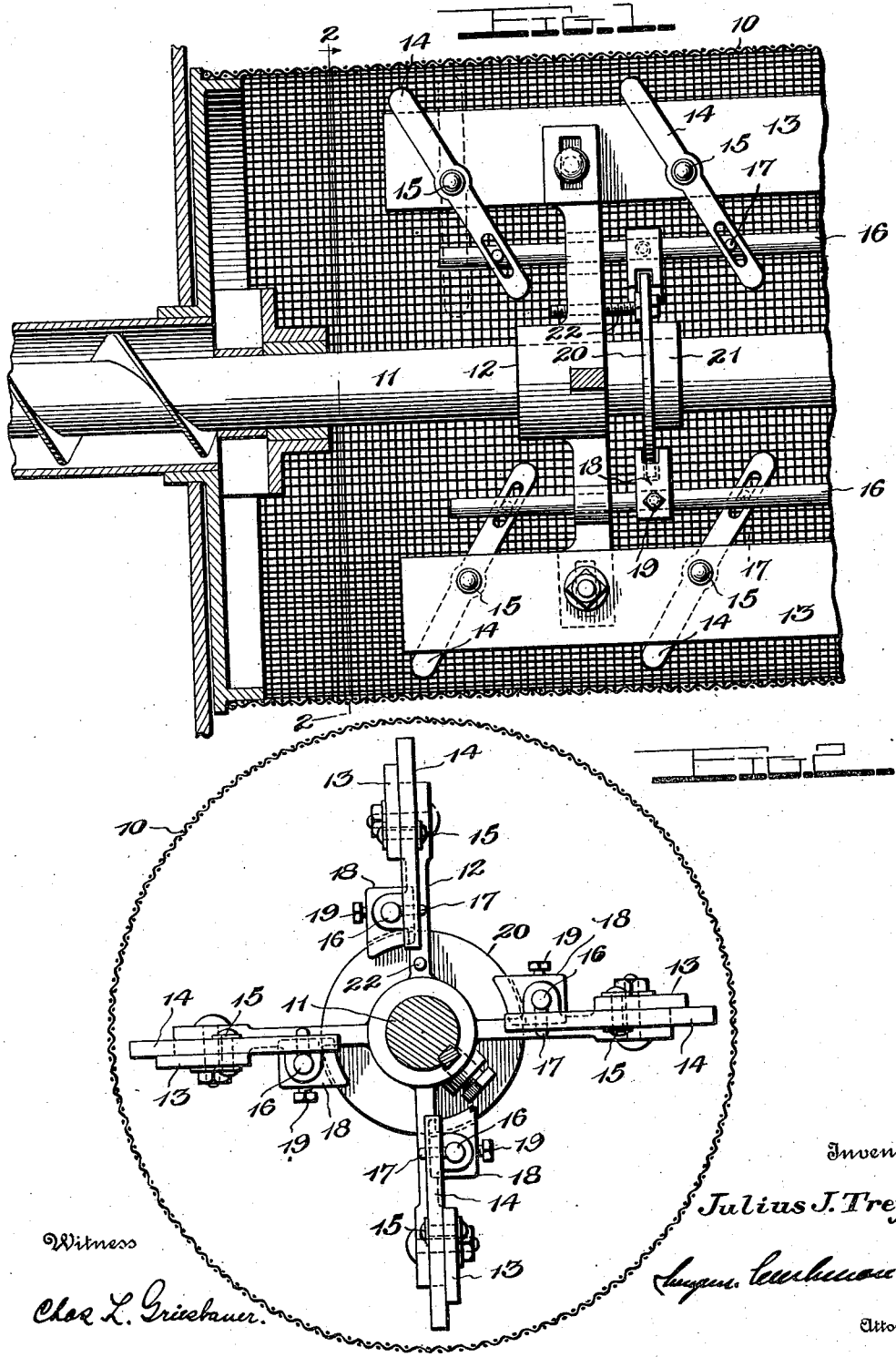

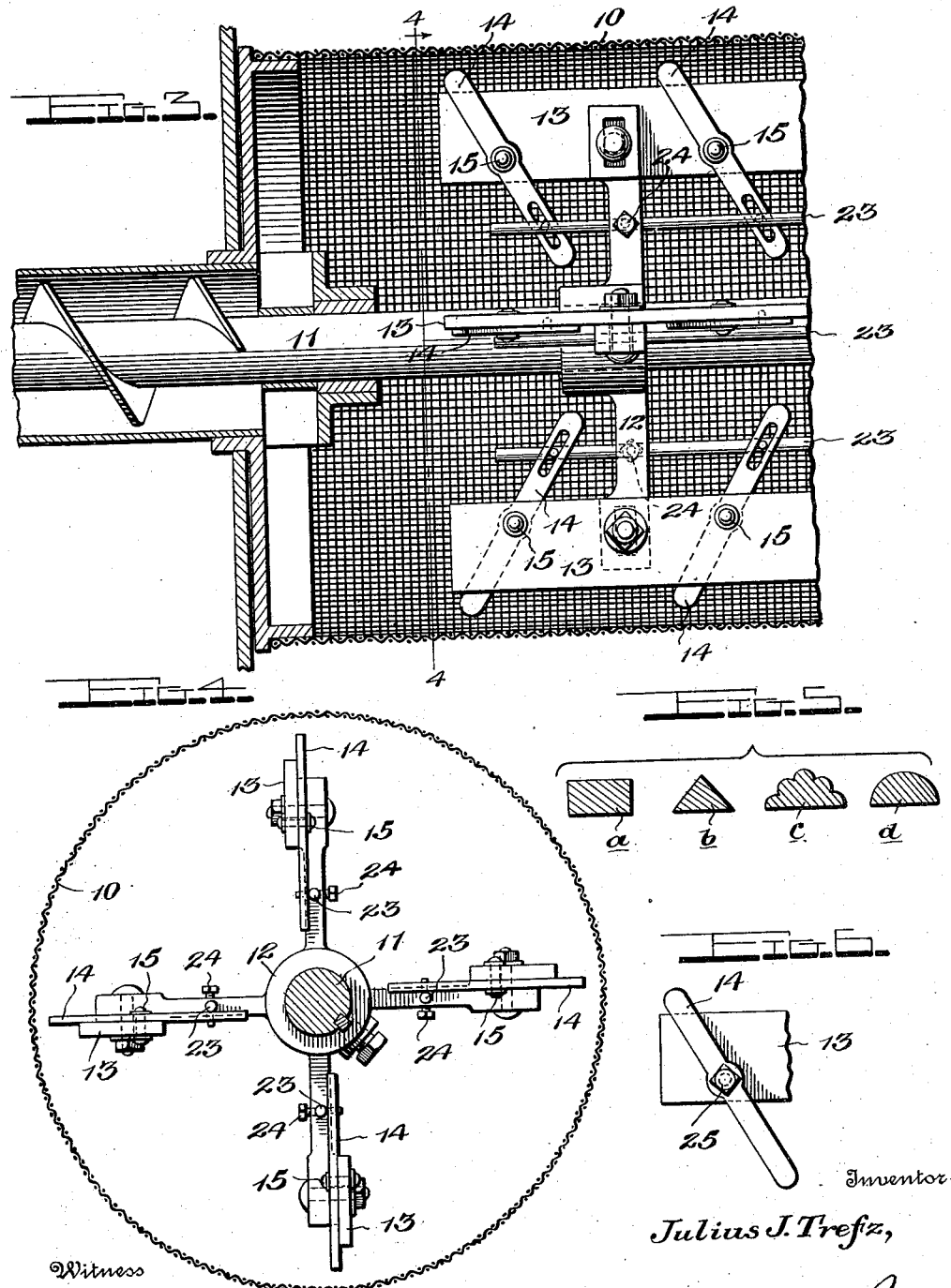

JULIUS J. TREFZ, OF OWENSBORO, KENTUCKY, ASSIGNOR TO THE ANGLO-AMERICAN MILL COMPANY, OF OWENSBORO, KENTUCKY, A CORPORATION OF KENTUCKY.

BEATER-BLADE FOR CENTRIFUGAL DRESSERS.

1,216,891.   Specification of Letters Patent.   Patented Feb. 20, 1917.

Application filed July 8, 1916. Serial No. 108,116.

*To all whom it may concern:*

Be it known that I, JULIUS J. TREFZ, a citizen of the United States, residing at Owensboro, in the county of Daviess and State of Kentucky, have invented new and useful Improvements in Beater-Blades for Centrifugal Dressers, of which the following is a specification.

The present invention relates to flour mills, and has to do with the centrifugal dressers or bolting reels ordinarily employed in such mills, and more particularly has for its object to provide an improved beater for such centrifugal dressers.

The purpose of my invention is to provide a beater which will thoroughly disintegrate the stock passing through the bolting reels, and, furthermore, to so arrange the beater blades as that they will shift the stock axially of the reel as it passes through such reel and is subjected to the dressing operation.

I accomplish this purpose by providing the beater blades with angularly adjustable fingers, means being provided to secure the necessary adjustment of these fingers to produce the disintegrating action and the shifting action on the stock entering the reel.

In the drawings herewith I have illustrated one embodiment of my invention, but it will be understood that this is merely illustrative and not restrictive, as the invention can be worked out by adopting mechanical expedients other than those shown in this particular embodiment.

In the drawings:—

Figure 1 is a view in side elevation, partly in section, of so much of a bolting reel and beater as will serve to illustrate my invention.

Fig. 2 is an end view, partly in section, of the construction shown in Fig. 1.

Fig. 3 is a side elevation, partly in section, of the construction shown in Fig. 1, showing a slightly different form of adjusting means for the disintegrating mechanism.

Fig. 4 is an end view, partly in section, of the mechanism shown in Fig. 3.

Fig. 5 shows a number of cross sectional forms which the agitating fingers may take.

Fig. 6 is a detail to show the individually adjustable finger.

Referring to the drawings by numbers, like numbers indicating like parts in the several views, 10 indicates conventionally a bolting reel, which is provided with the usual frame work, and heads and bolting cloth, this reel 10 being mounted on a shaft 11, and being provided with means (not shown) for rotating it in the usual manner.

The reel shaft 11 carries spiders 12 of any desired number and form, the said spiders being keyed to the shaft so as to rotate therewith, and the said spiders 12 carry beater blades 13 of any usual or desired construction, the mechanism as thus far described not differing materially from the bolting reels and beaters now commonly in use.

The function of the reel and beater is, of course, to dress out of the stock coming to the reel the throughs which pass through the reel silks to suitable conveyers, the coarser stock passing through the reel to be delivered at any proper point, or to be returned to the break section of the mill for further treatment.

While bolting reels as heretofore constructed are reasonably effective in the handling of the stock, they do not give that thorough disintegration of the stock which is desirable, and in order that thorough pulverization of the stock may be secured, and a maximum percentage of the throughs taken out, I have provided the beater blades with disintegrating fingers which will more thoroughly agitate the stock passing through the reel. The fingers 14 are pivotally mounted at 15 at any desired distance apart on the beater blades, these fingers being of any shape in cross section, and of such length as that their outer ends may be projected beyond the outer edges of the beater blades 13, while their inner ends project inwardly toward the shaft 11, as shown in Fig. 1, and because of the pivotal mounting of these fingers 14 they may be adjusted angularly so as to cause their outer ends to project more or less beyond and at different angles of the beater blades 13.

The ends of these fingers which project beyond the beater blades have a very effective disintegrating action on the stock in the reel, for they form projections which have a harrowing action on the stock and very thoroughly break up any massed or cohering particles therein.

It will be understood that each of the beater blades is provided with a gang of these disintegrating fingers, and in order that the fingers may be simultaneously and uniformly adjusted on all the beater blades I provide axially shiftable rods 16 slidably mounted in apertures in the spider arms, and connected by a pin and slot coupling 17 with the inner ends of the fingers 14, the pin and slot connection having sufficient range of movement to permit the fingers 14 to be carried from a minimum to a maximum projection beyond the beater blades 13. Each of the said rods 16 is provided with a stirrup block 18 adjustably secured thereto by means of the set screw 19, the said stirrup blocks 18 engaging a flange 20 on a collar 21 slidingly mounted on the shaft 11 adjacent a spider 12, to which spider, by means of an adjusting screw 22, the said flanged collar is secured, so that by adjusting the screw 22 the flanged collar 21 may be shifted axially and vary the position of the stirrup block 18, and through it and the rod 16 change the positions of the disintegrating fingers 14.

By this arrangement a simultaneous adjustment of all of the fingers carried by the beater blades may be secured, so that they will project more or less in accordance with the needs of the work.

In Fig. 3 I have shown a construction similar to that just described, except that provision is made of independently adjusting the fingers on each beater blade. In that construction the arrangement of shaft, spiders, beater blades, and pivot fingers is the same as that just described, but I dispense with the flanged collar for simultaneous adjustment of all the fingers, and provide each shifting rod 23 with the independent set screw 24, which is so mounted in the spider arm as to impinge upon and lock the rod 23 in any adjusted position.

By this arrangement it is possible to adjust the disintegrating fingers at different angles, and by doing this I am able to effect a feeding of the stock longitudinally of the reel at the same time disintegration thereof is going on, by simply advancing the disintegrating fingers from the horizontal to the vertical, so that a conveyer action is brought about on the stock which will be shifted back and forth in the reel, and more thoroughly agitated by this variation in the angle of the fingers relative to the beater blades. This is particularly true where the fingers are formed other than rectangular in cross section, as, for example, shown at $a$, $b$, $c$ and $d$ in Fig. 5 of the drawings, where cross sections are very efficacious in the harrowing and shifting of the stock. If it be desired to secure an independent adjustment of the individual fingers as distinguished from the simultaneous adjustment of all of them, or the simultaneous adjustment of each set as heretofore described, I propose, as shown in Fig. 6, to dispense with the adjusting rods which couple these fingers, and pivot each finger upon the blade by means of the set screw or bolt 25, which may be loosened to permit the finger to be set at any angle desired, and then tightened to lock it in such fixed position. By this arrangement each finger may be adjusted to any desired angle relative to the other fingers on the beater blade and relative to the fingers on any succeeding beater blade, so that great flexibility of adjusting to meet the different conditions is secured.

It will be understood that various mechanical expedients other than those herein set forth may be adopted without departing from the spirit of my invention, and I do not, therefore, limit myself to the details herein described, except in so far as I am limited by the terms of the appended claims, as such mechanical variations are obviously within the range of my invention.

I claim:—

1. A beater for centrifugal dressers having a plurality of agitating fingers pivotally mounted on a blade thereof.

2. A beater for centrifugal dressers having a plurality of agitating fingers pivotally mounted on a blade thereof, and means for adjusting said fingers.

3. A beater for centrifugal dressers having a plurality of agitating fingers pivotally mounted on a blade thereof, and means for simultaneously adjusting said fingers.

4. A beater for centrifugal dressers having a plurality of agitating fingers pivotally mounted on the blades thereof, and means for simultaneously adjusting the fingers on all of said beater blades.

5. A beater for centrifugal dressers having a plurality of agitating fingers pivotally mounted on a beater blade, adjustable means connecting the inner ends of said fingers, and means for locking said finger connecting means in any position of adjustment.

6. A beater for centrifugal dressers having a plurality of agitating fingers pivotally mounted on a beater blade, an axially disposed adjustable rod connecting the inner ends of said fingers, and means for locking said rod in any position of adjustment.

7. A beater for centrifugal dressers comprising a supporting shaft, beater spiders carried thereby, blades mounted on the arms of said spiders, agitating fingers pivotally mounted on said blades, a rod connecting the inner ends of said fingers adjustably mounted in said spider arms, and means for locking said rod in any adjusted position.

8. A beater for centrifugal dressers comprising a supporting shaft, spiders mounted thereon, beater blades carried by said spiders, agitating fingers pivotally mounted on said blades, means for connecting the inner ends of said fingers, and an axially adjustable device common to said finger connecting means to secure simultaneous adjustment of said agitating fingers.

9. A beater for centrifugal dressers comprising a supporting shaft, spiders mounted thereon, beater blades carried by said spiders, agitating fingers pivotally mounted on said blades, means for connecting the inner ends of said fingers, a collar axially adjustable on said shaft, and means for coupling said collar and said finger-connecting means to secure simultaneous adjustment of said agitating fingers.

10. A beater for centrifugal dressers comprising a supporting shaft, spiders mounted thereon, beater blades carried by said spiders, agitating fingers pivotally mounted on said beater blades, rods connecting the inner ends of said agitating fingers, an adjustable collar mounted on said shaft, a connection between said rods and said collar, and means for locking said collar in any position of adjustment.

11. A beater for centrifugal dressers comprising a supporting shaft, spiders mounted thereon, beater blades carried by said spiders, agitating fingers pivotally mounted on said beater blades, rods connecting the inner ends of said agitating fingers, a flanged collar adjustable on said shaft, a stirrup block on each rod engaging the flange of said collar, and means for locking said collar in any position for adjustment.

12. A beater for centrifugal dressers comprising a supporting shaft, spiders mounted thereon, beater blades carried by said spiders, agitating fingers pivotally mounted on said beater blades, rods connecting the inner ends of said agitating fingers, a flanged collar adjustable on said shaft, a stirrup block on each rod engaging the flange of said collar, and an adjusting screw connecting said collar with a fixed part of the reel to lock it in any position of adjustment.

13. A beater for centrifugal dressers comprising a supporting shaft, spiders mounted thereon, beater blades carried by said spiders, agitating fingers pivotally mounted on said beater blades, rods connecting the inner ends of said agitating fingers, a flanged collar adjustable on said shaft, a stirrup block on each rod engaging the flange of said collar, and an adjusting screw connecting said collar with a spider of the reel to lock it in any position of adjustment.

In testimony whereof I have hereunto set my hand in presence of two subscribing witnesses.

JULIUS J. TREFZ.

Witnesses:
E. FREEMAN LITTLE,
C. T. HOWSON.

Copies of this patent may be obtained for five cents each, by addressing the "Commissioner of Patents, Washington, D. C."